(12) United States Patent
Van Der Meer et al.

(10) Patent No.: US 8,028,616 B2
(45) Date of Patent: Oct. 4, 2011

(54) BEVERAGE MAKER WITH ADJUSTABLE BREW CHAMBER

(75) Inventors: Sijtze Van Der Meer, Hoogeveen (NL); Simon James Faneco, Ararat (AU); Shaun Alan East, St Kilda Eas (AU)

(73) Assignee: Koninklijke Philips Electronics N.V. (NL)

( * ) Notice: Subject to any disclaimer, the term of this patent is extended or adjusted under 35 U.S.C. 154(b) by 1416 days.

(21) Appl. No.: 10/561,453

(22) PCT Filed: Jun. 22, 2004

(86) PCT No.: PCT/IB2004/050967
§ 371 (c)(1),
(2), (4) Date: Dec. 20, 2005

(87) PCT Pub. No.: WO2004/112556
PCT Pub. Date: Dec. 29, 2004

(65) Prior Publication Data
US 2007/0137493 A1    Jun. 21, 2007

(30) Foreign Application Priority Data
Jun. 25, 2003   (EP) ..................................... 03101871

(51) Int. Cl.
*A47J 31/00* (2006.01)

(52) U.S. Cl. ........................... 99/284; 99/295; 99/302 R

(58) Field of Classification Search ................ 99/302 R, 99/295, 284, 304, 305, 306, 307
See application file for complete search history.

(56) References Cited

U.S. PATENT DOCUMENTS

| 4,497,243 | A   | * | 2/1985  | Cavalli ............................ 99/323 |
| 5,259,296 | A   |   | 11/1993 | Mikael et al. |
| 5,316,781 | A   |   | 5/1994  | Luessi et al. |
| 5,492,054 | A   |   | 2/1996  | Schneeberger |
| 6,021,706 | A   | * | 2/2000  | Seguenot et al. ............... 99/319 |
| 6,192,786 | B1  | * | 2/2001  | Gasser et al. ................... 99/319 |
| 6,748,850 | B1  | * | 6/2004  | Kraan .......................... 99/289 R |
| 6,857,355 | B2  | * | 2/2005  | Rolland ...................... 99/302 R |

FOREIGN PATENT DOCUMENTS

| CH | 596810 A    | 3/1978  |
| EP | 0280594 B1  | 12/1989 |
| EP | 0380450 A   | 8/1990  |
| EP | 0922425 A1  | 6/1999  |
| JP | 5506389     | 5/1993  |
| JP | 08004562 A  | 1/1996  |

* cited by examiner

*Primary Examiner* — Reginald L Alexander

(57) ABSTRACT

A beverage maker for brewing a beverage from water and a quantity of particle material includes a water supply structure, a brewing chamber downstream of the water supply structure, and a dispensing channel downstream of the brewing chamber. A bounding member is adjustable for adjusting the operational size of the brewing chamber, and an adjustment structure is provided for adjusting said bounding member. The adjustment structure is adjustable in response to the quantity of particles present in said brewing chamber.

18 Claims, 4 Drawing Sheets

BEVERAGE MAKER WITH ADJUSTABLE BREW CHAMBER

This invention relates to a beverage maker according to the introductory portion of claim 1.

Such a beverage maker is known from U.S. Pat. No. 5,492,054 which describes a coffee maker in which the size of the brewing chamber during brewing of coffee by extraction in the brewing chamber is adjusted in accordance with the setting of a coffee granulate dispenser also included in the coffee maker.

While coffee makers with integrated coffee granulate dispensers are convenient in use, the complex construction of such coffee makers entail manufacturing costs that cause such coffee makers to be too expensive for most households. Therefore, most coffee makers for domestic use, including coffee makers having a brewing chamber through which the water is displaced under pressure, such as espresso machines and a coffee maker as is, for example, described in International patent application WO 01/15582, require the coffee granulate to be brought into the brewing chamber manually, either in the form of a loose granulate or in the form of pads or cups containing the granulate. However, this entails that adjustments of the size of the brewing chamber to the amount of coffee granulate from which coffee is to be brewed, if at all possible, need to be made manually. This in turn is cumbersome and entails the risk of the brewing chamber size being selected wrongly, for instance if the user is unfamiliar with the coffee makers or forgets to change the size of the brewing chamber when coffee is to be brewed from a different amount of coffee granulate than during a previous coffee brewing operation.

It is an object of the present invention to provide a beverage maker with an automatically adjustable brewing chamber which does not require a granulate dispenser in order to obtain information about the amount of particle material from which a beverage is to be brewed.

According to the present invention, this object is achieved by providing a beverage maker according to claim 1. Since the adjustment structure is adjustable in response to the quantity of particle material present in the brewing chamber, the adjustment structure can set the size and or shape of the brewing chamber in accordance with the particle material manually placed in the brewing chamber.

Particular embodiments of beverage makers according to the invention are set forth in the dependent claims.

Further aspects, effects and details of embodiments of the invention embodiments are described below with reference to an example of a beverage maker according to the invention shown in the drawings.

Figure 1:
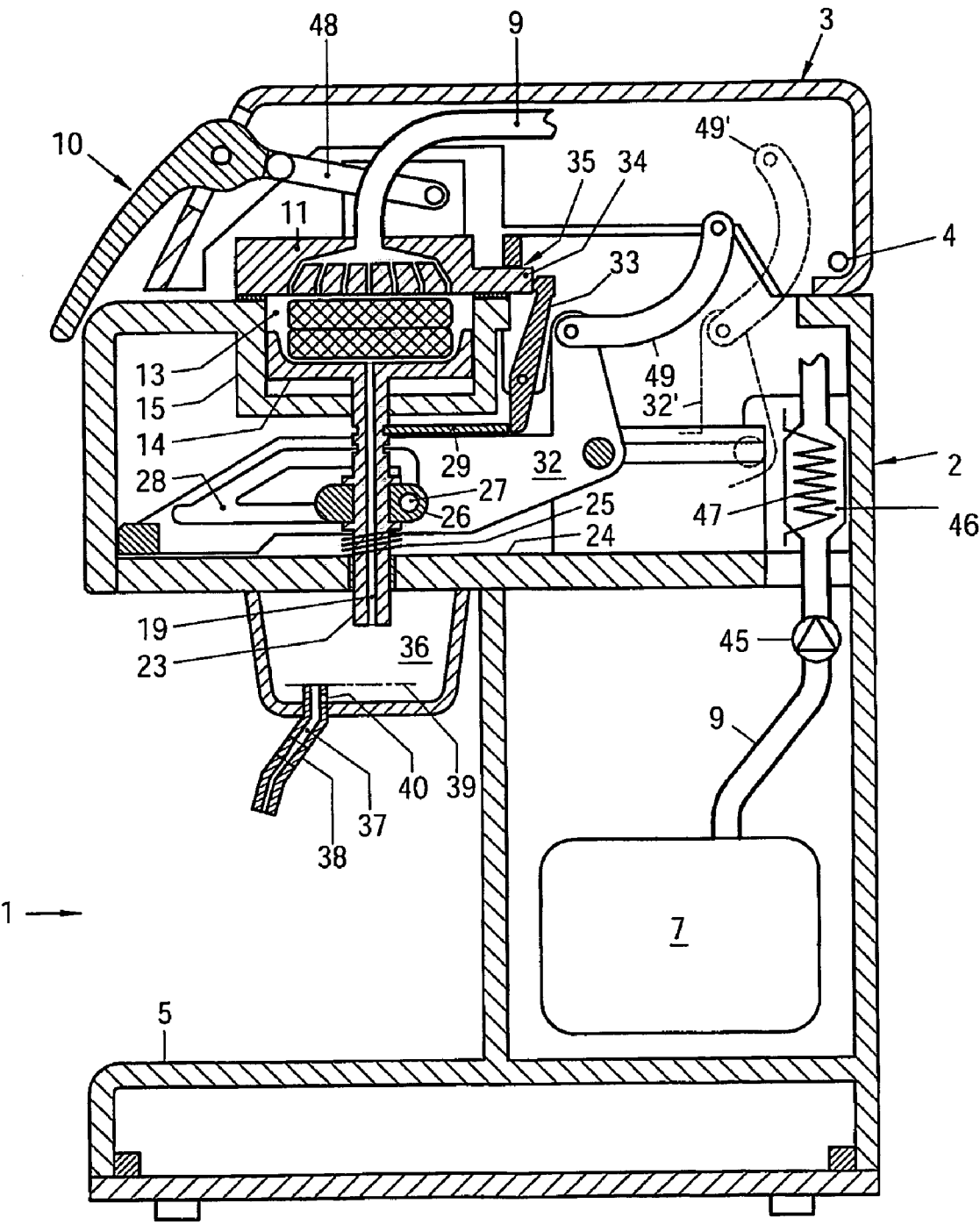
FIG. 1 is a somewhat schematized side view in cross-section along a vertical, central plane of an example of a beverage maker according to the invention.

In FIG. 1, reference numeral 1 designates a coffee maker according to the invention for preparing coffee extract having a small-bubble foam layer. In the present description of examples of embodiments of the invention, the product from which a beverage is to be brewed is a coffee granulate. It will be clear, however, that other products such as cocoa, milk powder, dried stock, tea, herbs, etc. may also be used as products from which beverages can be brewed.

The coffee maker 1 has a housing 2 and a lid 3 hinged to the housing 2 by a hinge 4 and fixed in closed position by a closure lever 10. The housing 2 has a forwardly extending portion of which a top surface 5 forms a plateau for supporting one or more cups to be filled with coffee. Within the housing, a water reservoir 7 is located. A conduit 9 extends through a heating chamber 46 in which an electric heating element 47 is arranged. For providing a pressurized supply of water from the reservoir 8, a pump 45 is arranged in the conduit 9 upstream of the heater 47.

A water distributing head 11 is integrated in the lid 3, bounds a top end of a brewing chamber 13 in a brewing receptacle 15, and forms the end of the conduit 9 and of the water supply structure. A movable bottom 14 inside the brewing receptacle 15 forms a bounding member bounding a lower end of the coffee-brewing chamber 13. Since the bottom 14 is movable between two operational positions, the operational size of the brewing chamber 13 is adjustable to the number of pads 18, i.e. to the amount of coffee granulate from which coffee is to be brewed.

Support stubs (not shown) of the bottom 14 may project upwardly, and interspaces between these projections allow beverage liquid—according to the present example coffee extract—pressed out of one or more pads or pouches 18 containing a ground coffee granulate or powder to flow to a discharge passage 19 passing through the bottom 14. A piston 23 supports the bottom 14, which piston in its turn is guided by the receptacle 15 and by a support platform 24 of the main housing 2 and is supported by the support platform 24 via a spring 25. The dispensing channel 19 extends through the piston member 23 so that a simple solution is provided for reliably leading the coffee extract past the adjustment structure.

In operation, the brewing chamber 13 is watertightly sealed, so that no significant loss of pressure generated by the pump 45 occurs and all or virtually all pressure generated by the pump 45 is applied to the brewing chamber 13 when coffee is being extracted. If other drinks than coffee are to be prepared, the pad may contain other substances, for example cocoa powder and/or milk powder, which may be flavored and/or sweetened.

The discharge opening 19 debouches into a foam-up chamber 36 that communicates with a dispensing channel 37 extending through a dispensing spout 38 via which coffee extract dispensed in the chamber 36 can flow into the cups on the platform 5. It is also possible to provide two or more dispensing channels in communication with the foam-up chamber. For forming foam on a coffee extract, the coffee extract is jetted from the nozzle 22 into a buffer quantity 39 of coffee extract in the foam-up chamber 36. During each brewing cycle, a buffer quantity 39 of coffee extract is built up, coffee and foam formed thereon are dispensed via the channel 37, and finally the buffer quantity 39 is drained via a drain hole 40.

The adjustment structure for adjusting the position of the bottom 14 includes the piston 23 and a connecting member 26 fixed to the piston 23. The connecting member 26 is provided with guide stubs 27, in this example ends of pins (best seen in FIGS. 2 to 5, 8 and 9) that are engaged in guide grooves 28 on both sides of the connecting member 26 (since FIGS. 1 to 5 are views in cross-section through a central plane, only one of the stubs 27 and one of the grooves 28 is visible each time.

When coffee has been positioned in the brewing chamber 13 and the lid 3 is closed, the water distributing head 11 pushes the pad or pads (or loose coffee if no pads are used) into the brewing chamber 13. The resilient suspension of the bottom 14 via the piston 23 and the spring 25 allows the bottom 14 to adjust itself to the displacement of the coffee 18 on top of it while the spring 25 is compressed.

Since the adjustment structure is thus adjustable in response to the quantity of particles 18 present in the brewing chamber 13, the size of the brewing chamber 13 is automatically adjusted to the amount of coffee in the brewing chamber, without being dependent on the setting of a granulate dispenser or manually selected settings.

The resilient member 25 for resiliently urging the bottom 14 against particles or a pad of particles 18 in the brewing chamber 13 forms a simple structure for accommodating the amount of coffee granulate in the brewing chamber 13 and provides a compression of the granulate in the brewing chamber 13 that is predetermined within reasonably narrow margins, which is advantageous for obtaining a coffee extract with predictable organoleptic properties.

Figure 10:
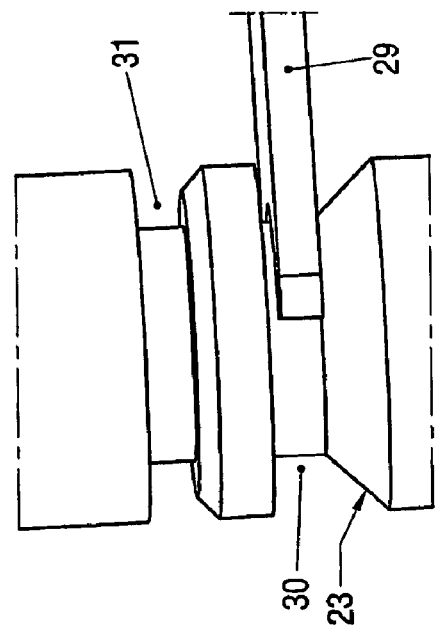
FIG. 10 is an enlarged side view of a portion of the lock shown in FIG. 9.
Figure 8:
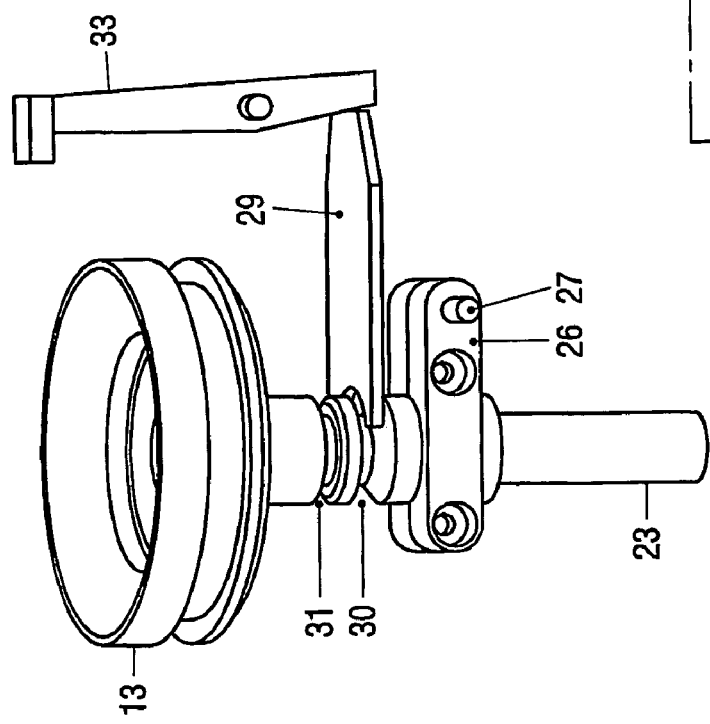
FIG. 8 is a perspective view of some parts of the beverage maker according to FIGS. To-7 including an adjustable bounding member for bounding a brewing chamber and a blocking structure for locking the position of the bounding member in unlocked condition.

In order to avoid that the bottom 14 is displaced under the influence of a water pressure drop across the bottom 14 exerting a greater pressure on the bottom 14 than the pressure exerted by the spring 25, the coffee maker 1 further includes a locking member 29 for locking the bottom 14 in a position determined by the particles or the at least one pad of particles in the brewing chamber 13. According to this example, the locking member 29 has a fork-shaped end facing the piston 23, which is adapted to engage one of the grooves 30, 31 (see FIGS. 8 to 10) in the piston 23. The positions of the grooves 30, 31 in the piston 23 relative to the position of the locking member 29 correspond to the positions of the bottom 14 required for brewing coffee from a single pad and from two pads of coffee, respectively.

The locking member 29 is guided between the receptacle 15 and an operating member 32 in which the groove 28 is formed. Furthermore, a lever 33 pivotably suspended to the housing 2 engages the locking member 29. The lever 33 is operable by horizontal movement of the water distributing head 11 for locking the lid 3 by causing catches 34 projecting radially from the water distributing head 11 to engage slots 35 in the housing 2. Thus, the locking of the cover 11 of the brewing chamber 11 in closed condition also causes the locking of the position of the bottom 14 determined by the amount of coffee placed in the brewing chamber. The closing lever 10 operates the locking action of the water distributing head 11 via a lever 48. It is observed that, instead of locking in one of two predetermined positions as is provided for by the present example, it is also possible to provide a locking structure for locking the position of the bottom in more positions or even in any position, for instance using a clamp or a locking wedge instead of the locking member 29 provided with a fork.

Since, according to the present example, the cover 11 of the brewing chamber 13 is displaceable away from the brewing chamber 13 for allowing access to the brewing chamber 13 for placing particles or at least one pad 18 of particles in the brewing chamber 13, and the adjustable bounding member 14 is at the bottom end of the brewing chamber 13, the closing action of the cover 11 after coffee has been put in the brewing chamber 13 conveniently provides the displacing action that determines the size of the brewing chamber during the subsequent extraction of coffee.

Furthermore, according to the present example, the cover 11 of the brewing chamber 13 is operatively connected to the adjustment structure. Thus a movement of the bottom 14 to accommodate the amount of coffee in the brewing chamber is automatically operated by the opening and closing of the cover 11, which is required anyway for gaining access to the brewing chamber for placing fresh coffee granulate for brewing fresh coffee.

More in particular, according to the present example, the operating member 32 is connected to the lid 3 via a link 49. The positions of the link 49 and of a rear portion of the operating member 32 when the lid is in fully opened condition are represented by dash-and-dot lines 49' and 32', respectively.

Figure 5:
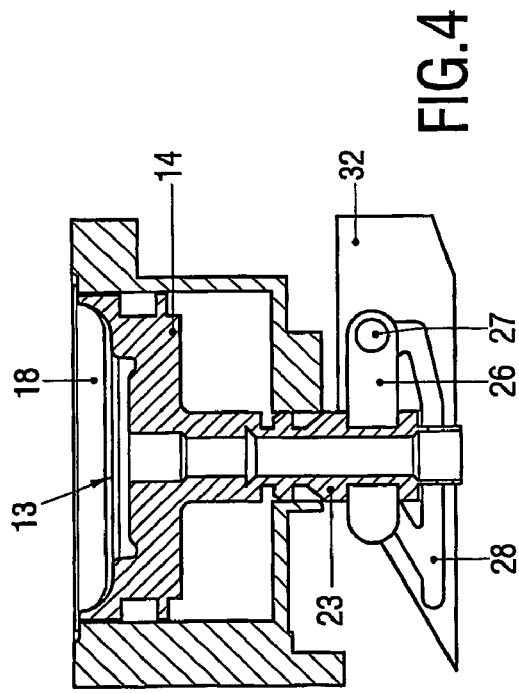

The adjustment structure is further arranged for displacing the bottom 14 into a particle or pad removal position illustrated by FIG. 5, causing the chamber 13 to be smaller than in the position in which the chamber has a volume for accommodating a single portion or pad of particles. This facilitates the removal of pads 18 after brewing of coffee.

The adjustment structure is also arranged for displacing the bottom 14 into the particle or pad removal position only once between successive brewing operations, so that the coffee is not expelled before coffee has been brewed.

Figure 2:
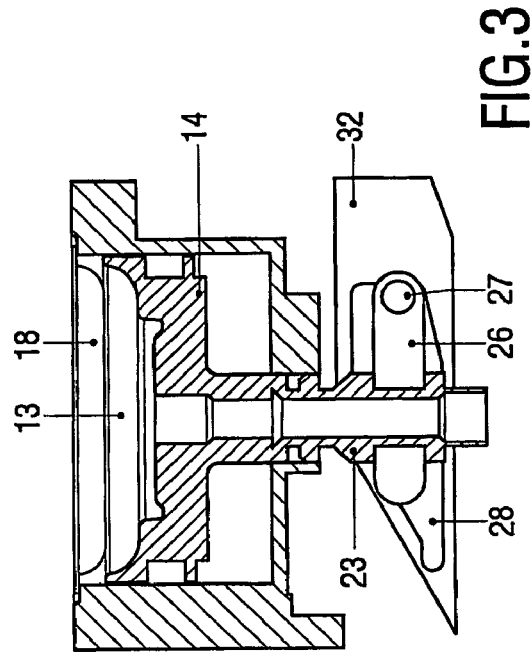
FIGS. 2 to 5 are cut-of schematic side views in cross-section along a vertical, central plane of a beverage chamber area of the beverage maker according to FIG. 1 in various stages of operation.
Figure 3:
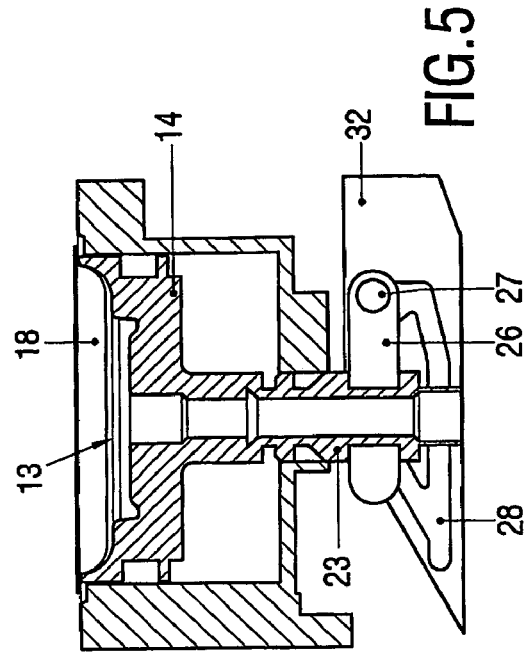
Figure 4:
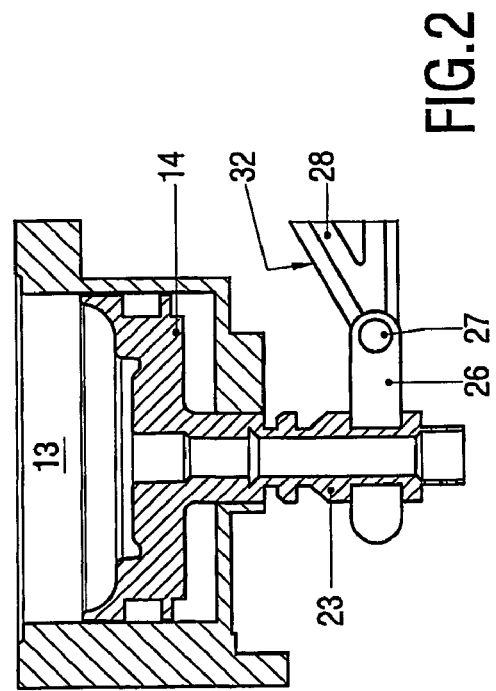

Furthermore, the adjustment structure is arranged for displacing the bottom into a particle or pad receiving position, illustrated by FIG. 2, causing the chamber 13 to be expanded to its largest size between successive brewing operations, and from its pad receiving position directly to its brewing position (in this example, either with two pads as illustrated by FIG. 3, or with one pad as illustrated by FIG. 4) before each brewing operation, and from its brewing position (FIG. 3 or 4) via the pad removal position (FIG. 5) back to the pad receiving position (FIG. 2) after each brewing operation.

To achieve this, a guide structure may be provided for guiding the connecting member 26 along a circulatory path in accordance with a reciprocating movement of the cover 11 of the brewing chamber 13.

According to the present example, the groove 28 in the operating member 32 guided by the platform 24 forms the circulatory path. The groove or ridge is movable back and forth with the operating member 32 and is operatively connected to the cover 11, so that the movement back and forth of the operating member 32 is caused when the cover 11 (i.e. the lid) is opened and closed.

Figure 6:
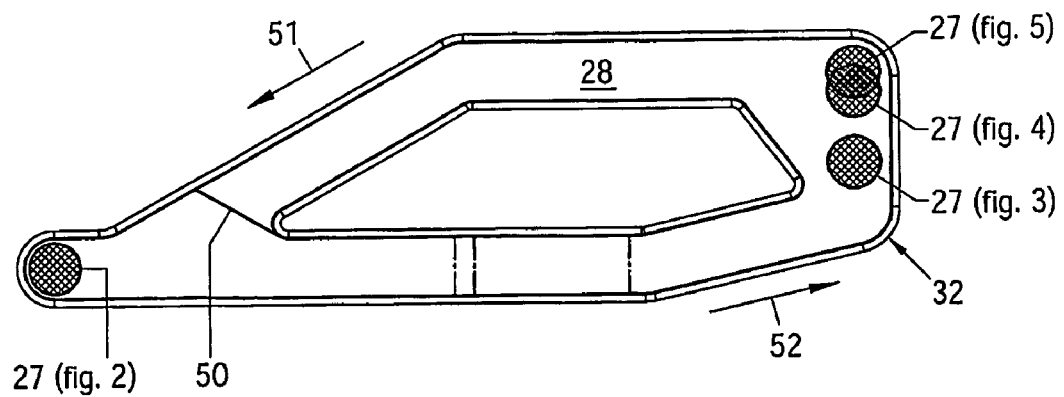
FIG. 6 is a side view of an operating member of the adjustment structure of the beverage maker according to FIGS. 1 to 5.
Figure 9:
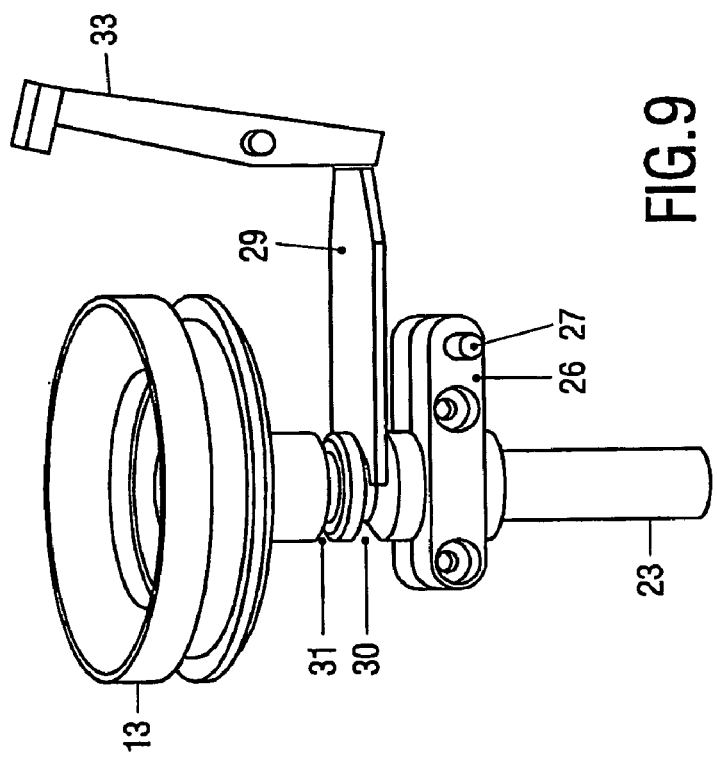
FIG. 9 is a perspective view according to FIG. 8 in locked condition.

FIG. 6 illustrates the positions of the stub 27 in the groove as the stub is circulated in the sense indicated by arrows 51, 52. The relations with associated ones of the FIGS. 2 to 5 are indicated between brackets.

Figure 7:
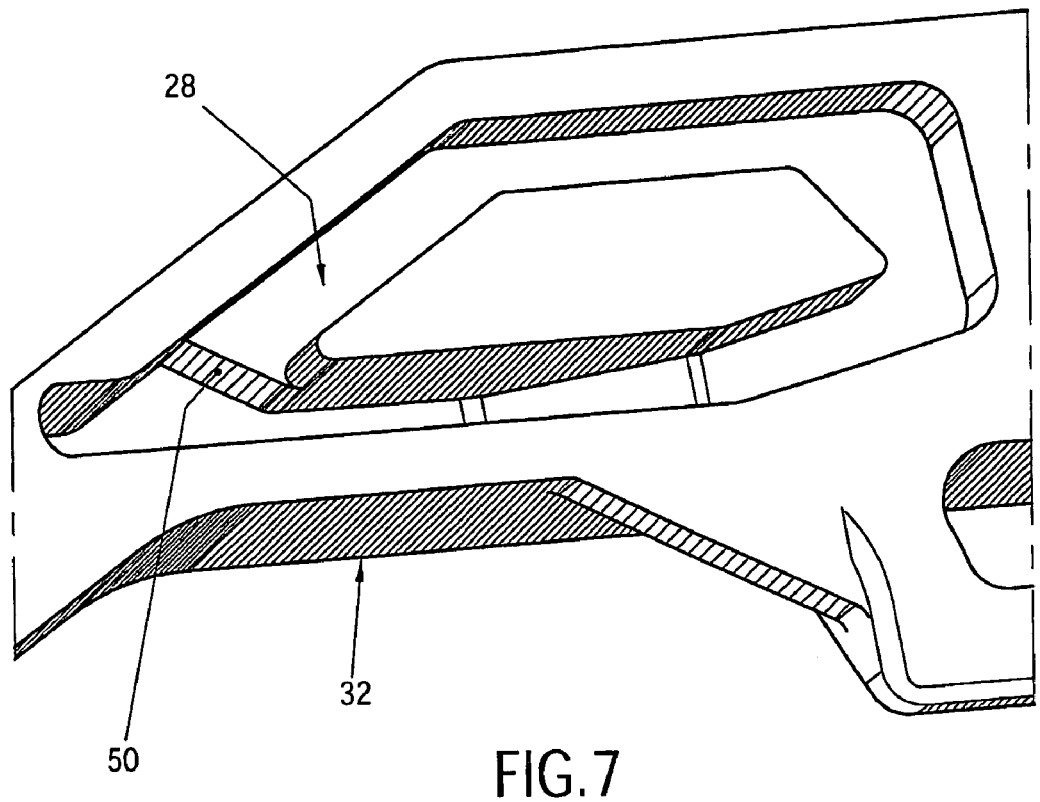
FIG. 7 is a perspective view of a groove in the operating member shown in FIG. 6.

To ensure that the sequence of positions as illustrated by FIGS. 2 to 5 and 6 is maintained in the same order during each brewing procedure, the adjustment structure is adapted for causing circulation of the connecting member 26 through the groove 28 in one sense of circulation only. According to the present example, this is achieved by providing the groove with a step 50 (see FIG. 7) and causing the connecting member 36 to be resiliently urged into the groove at least when in the vicinity of the step 50.

The invention claimed is:
1. A beverage maker for brewing a beverage from water and a quantity of particle material, comprising:
    a water supply structure;

a brewing arrangement bounding a brewing chamber downstream of the water supply structure for receiving water supplied by the water supply structure; said brewing arrangement comprising a bounding member adjustable for adjusting the operational size of the brewing chamber and an adjustment structure for adjusting said bounding member; and a dispensing channel downstream of the brewing chamber when in an operational condition during the brewing of a beverage;

wherein said adjustment structure automatically adjusts in response to the quantity of particles present in said brewing chamber, wherein at least a portion of said dispensing channel extends through a piston member that extends downwards from said bottom, said piston being part of said adjustment structure.

2. The beverage maker according to claim 1, wherein said adjustment structure further comprises a resilient member for resiliently urging said bounding member against particles or a pad containing particles in said brewing chamber.

3. The beverage maker according to claim 2, further comprising a locking member for locking said bounding member in a position determined by the quantity of particles in said brewing chamber.

4. The beverage maker according to claim 1, wherein the brewing chamber has a cover that is displaceable away from said brewing chamber for allowing access to said brewing chamber, and wherein said bounding member forms at least a portion of the bottom of said brewing chamber.

5. The beverage maker according to claim 4, wherein said cover is operatively connected to said adjustment structure.

6. The beverage maker according to claim 1, wherein said adjustment structure is arranged for displacing said bounding member in inward direction through said chamber from the position of the bounding member adapting the size of said chamber for accommodating a smallest portion or single pad of particles into a particle or pad removal position.

7. The beverage maker according to claim 6, wherein the adjustment structure is arranged for displacing the bounding member into said particle or pad removal position only once between successive brewing operations.

8. The beverage maker according to claim 7, wherein said adjustment structure is arranged for displacing said bounding member into an enlarged particle or pad receiving position between successive brewing operations, and from its pad receiving position directly to its brewing position before each brewing operation, and from its brewing position via said pad removal position to said pad receiving position after each brewing operation.

9. A beverage maker for brewing a beverage from water and a quantity of particle material, comprising:

a water supply structure;

a brewing arrangement bounding a brewing chamber downstream of the water supply structure for receiving water supplied by the water supply structure; said brewing arrangement comprising a bounding member adjustable for adjusting the operational size of the brewing chamber and an adjustment structure for adjusting said bounding member; and a dispensing channel downstream of the brewing chamber when in an operational condition during the brewing of a beverage;

wherein said adjustment structure automatically adjusts in response to the quantity of particles present in said brewing chamber, wherein said cover is operatively connected to said adjustment structure, wherein the adjustment structure further comprises a guide structure for guiding a connecting member along a circulatory path in accordance with a reciprocating movement of said cover.

10. The beverage maker according to claim 9, wherein said circulatory path is at least one groove or ridge, that is movable back and forth and is operatively connected to said cover, the adjustment structure being adapted for causing a circulation of said connecting member along said circulating path in one sense of circulation only.

11. The beverage maker according to claim 10, wherein said groove or ridge includes a guide step for causing the circulation of said connecting member along said circulating path to take place in one sense of circulation only.

12. A beverage maker for brewing a beverage from water and a quantity of particle material, comprising:

a water supply structure;

a brewing arrangement bounding a brewing chamber downstream of the water supply structure for receiving water supplied by the water supply structure; said brewing arrangement comprising a bounding member adjustable for adjusting the operational size of the brewing chamber and an adjustment structure for adjusting said bounding member; and a dispensing channel downstream of the brewing chamber when in an operational condition during the brewing of a beverage;

wherein said adjustment structure is adjustable in response to the quantity of particles present in said brewing chamber, wherein at least a portion of said dispensing channel extends through a piston member that extends downwards from a bottom portion of said brewing chamber, said piston being part of said adjustment structure.

13. A beverage maker for brewing a beverage from water and a quantity of particle material, comprising:

a water supply structure;

a brewing arrangement bounding a brewing chamber downstream of the water supply structure for receiving water supplied by the water supply structure; said brewing arrangement comprising a bounding member adjustable for adjusting the operational size of the brewing chamber and an adjustment structure for adjusting said bounding member; and a dispensing channel downstream of the brewing chamber when in an operational condition during the brewing of a beverage;

wherein said adjustment structure is adjustable in response to the quantity of particles present in said brewing chamber, wherein the brewing chamber has a cover that is displaceable away from said brewing chamber for allowing access to said brewing chamber for placing particles or at least one pad of particles in the brewing chamber, and wherein said bounding member forms at least a portion of the bottom of said brewing chamber, wherein said cover is operatively connected to said adjustment structure, wherein the adjustment structure further comprises a guide structure for guiding a connecting member along a circulatory path in accordance with a reciprocating movement of said cover.

14. The beverage maker according to claim 13, wherein said circulatory path is at least one groove or ridge, that is movable back and forth and is operatively connected to said cover, the adjustment structure being adapted for causing a circulation of said connecting member along said circulating path in one sense of circulation only.

15. The beverage maker according to claim 14, wherein said groove or ridge includes a guide step for causing the circulation of said connecting member along said circulating path to take place in one sense of circulation only.

16. A beverage maker for brewing a beverage from water and a quantity of particle material, comprising:
- a water supply structure;
- a brewing arrangement bounding a brewing chamber downstream of the water supply structure for receiving water supplied by the water supply structure; said brewing arrangement comprising an adjustable bottom portion for adjusting the operational size of the brewing chamber and an adjustment structure for adjusting said adjustable bottom portion;
- a cover;
- a locking member; and
- a dispensing channel downstream of the brewing chamber when in an operational condition during the brewing of a beverage;
- wherein said adjustable bottom portion automatically adjusts in response to the quantity of particles present in said brewing chamber, and wherein the cover is displaceable away from said brewing chamber for allowing access to said brewing chamber, and wherein the locking member is operable in response to locking the cover in a closed position, to lock the adjustable bottom portion in an adjusted position.

17. The beverage maker according to claim 16, wherein at least a portion of said dispensing channel extends through a piston that is operatively coupled to and extends downwards from the adjustable bottom portion.

18. The beverage maker according to claim 17, comprising a biasing spring, wherein the biasing spring is configured to bias the piston in an upward direction.

* * * * *